Feb. 17, 1948.    G. R. PURIFOY    2,436,330
DYNAMIC BRAKING SYSTEM FOR SERIES MOTORS
Filed Feb. 28, 1946    2 Sheets-Sheet 1

INVENTOR
George R. Purifoy.
BY
G. M. Crawford
ATTORNEY

Feb. 17, 1948.    G. R. PURIFOY    2,436,330
DYNAMIC BRAKING SYSTEM FOR SERIES MOTORS
Filed Feb. 28, 1946    2 Sheets-Sheet 2

WITNESSES:

INVENTOR
George R. Purifoy.
ATTORNEY

Patented Feb. 17, 1948

2,436,330

UNITED STATES PATENT OFFICE 2,436,330

DYNAMIC BRAKING SYSTEM FOR SERIES MOTORS

George R. Purifoy, Pittsburgh, Pa., assignor to Westinghouse Electric Corporation, East Pittsburgh, Pa., a corporation of Pennsylvania Application February 28, 1946, Serial No. 650,949

10 Claims. (Cl. 318—381)

My invention relates, generally, to control systems and, more particularly, to systems for controlling the operation of the propelling motors of electric vehicles and the like.

An object of my invention, generally stated, is to provide a control system which shall be simple and efficient in operation and which may be economically manufactured and installed.

A more specific object of my invention is to control the building up of dynamic braking of an electrically propelled vehicle.

Another object of my invention is to prevent overvoltage of the motors during dynamic braking.

Other objects of my invention will be explained fully hereinafter or will be apparent to those skilled in the art.

In accordance with one embodiment of my invention, the operation of the field shunting switches for the motors of a vehicle is so controlled by a current limit relay that the dynamic braking current and hence the motor voltage are limited to a safe value. Starting of the progression of the braking resistor shunting means is controlled by the field shunting switches.

Figures 1A, 2:
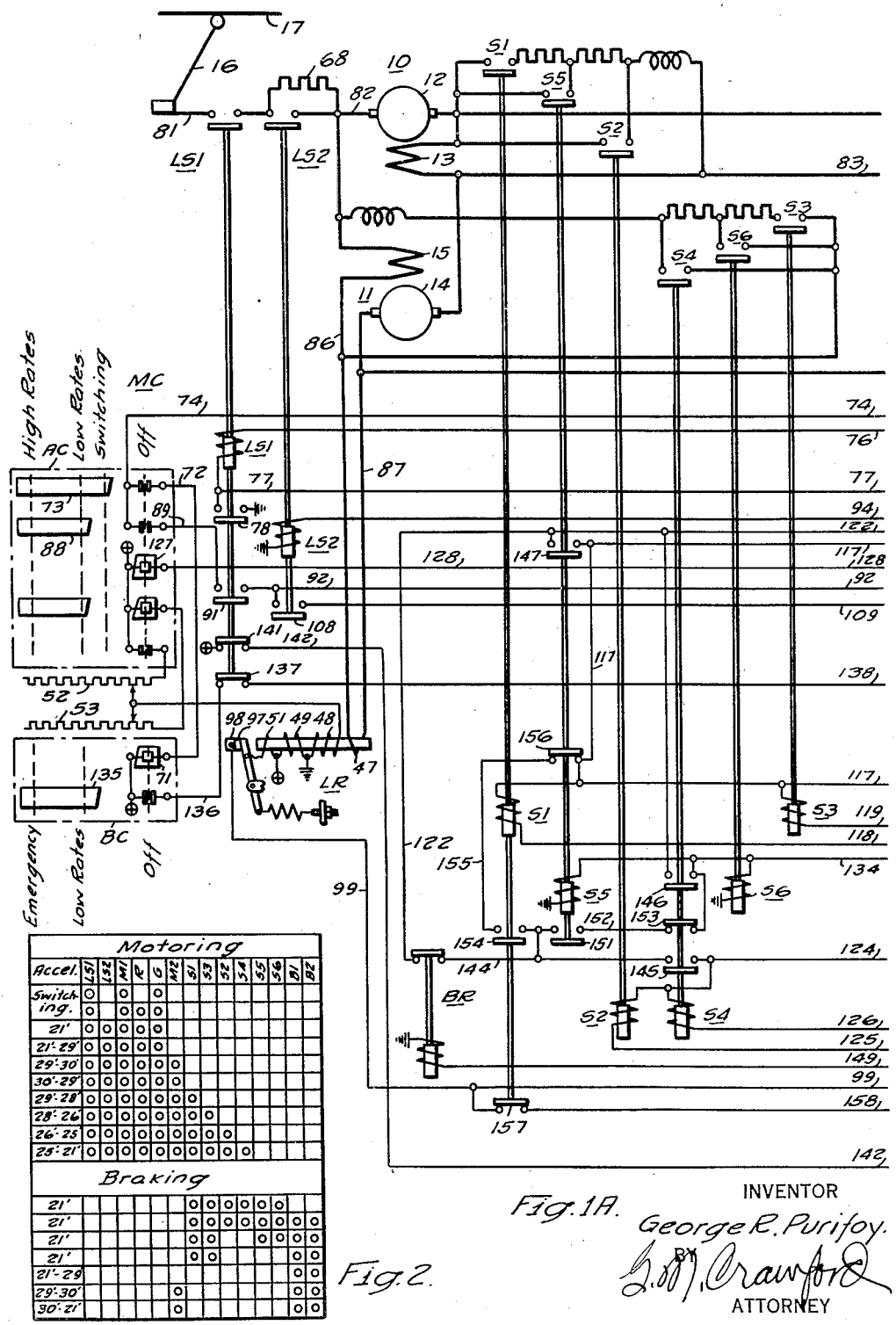
Figure 1B:
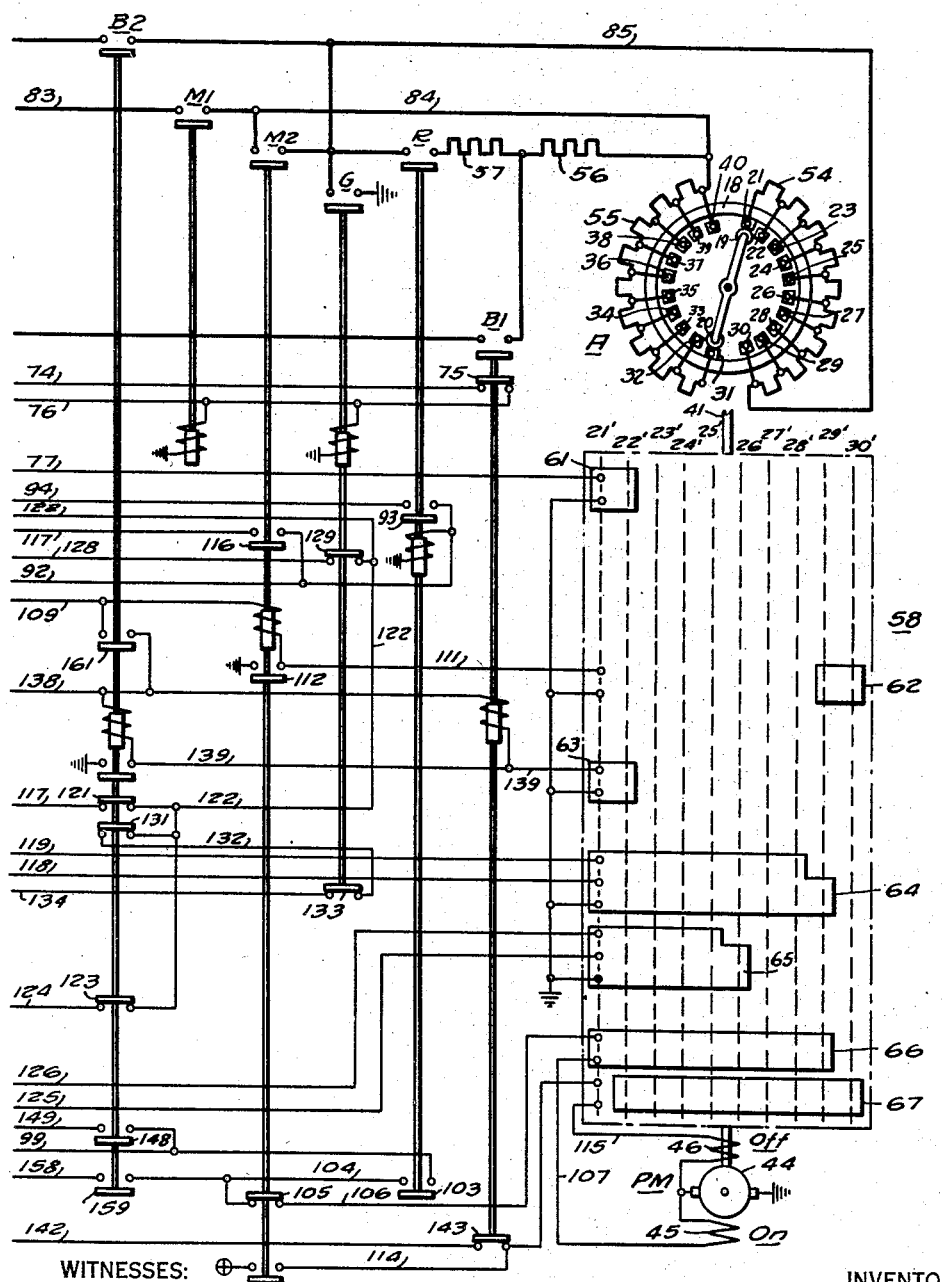

For a fuller understanding of the nature and objects of my invention, reference may be had to the following detailed description, taken in conjunction with the accompanying drawings, in which:

Figures 1A and 1B, when combined, constitute a diagrammatic view of a control system embodying the principal features of my invention, and Fig. 2 is a chart showing the sequence of operation of part of the apparatus illustrated in Figs. 1A and 1B.

Referring to the drawings, a pair of motors 10 and 11 may be utilized for propelling a vehicle (not shown). The motor 10 is provided with an armature winding 12 and a series field winding 13. Likewise, the motor 11 is provided with an armature winding 14 and a series field winding 15. A line switch LS1 is provided for connecting the motors 10 and 11 to a trolley 16 which engages a power conductor 17 that may be energized from any suitable source of power, such as a generating station (not shown).

The motors 10 and 11 are connected in parallel-circuit relation during acceleration of the vehicle. They may also be connected for dynamic braking with the field winding 15 of motor 11 connected across the armature 12 of motor 10 and the field winding 13 of motor 10 connected across the armature 14 of motor 11, thereby permitting the current in the armatures to reverse and cause the motors to act as generators and decelerate the vehicle. A pair of switches B1 and B2 is provided for establishing the dynamic braking connections.

Both the acceleration and the deceleration of the motors 10 and 11 are primarily controlled by a motor driven accelerator A which is of the same general type as the one described in Patent No. 1,991,229, issued February 12, 1935, to L. G. Riley. The accelerator A comprises a circular bus 18, inside of which are disposed a plurality of contact fingers 21 to 40, inclusive, which are progressively forced against the bus 18 by a pair of revolving rollers 19 and 20.

The rollers 19 and 20 are driven by a pilot motor PM through a shaft 41. The pilot motor PM is provided with an armature winding 44 and two field windings 45 and 46, one for each direction of rotation of the motor. The energy for operating the pilot motor and the control apparatus may be supplied by a battery or other suitable source of control energy.

A limit relay LR is provided for controlling the operation of the pilot motor PM during both acceleration and deceleration of the motor. As shown, the relay LR is provided with several different actuating coils which function to operate the relay during acceleration and dynamic braking. Thus, a series coil 47 is connected in the motor circuit during both acceleration and deceleration of the vehicle. A variable rate coil 48 is energized during acceleration and dynamic braking for controlling the accelerating and braking rates. A coil 49 may be energized from the control source to aid in the operation of the relay, and a tickler coil 51 may also be energized from the control source to cause a vibratory action of the relay in a manner well known in the art.

In order to provide for changing the setting of the relay LR, thereby governing the rates of acceleration and deceleration of the vehicle by varying the speed of the pilot motor PM, which in turn, controls the rate at which resistance is shunted from the motor circuit to vary the motor current, variable resistors 52 and 53 are connected in the energizing circuit for the rate coil 48. The resistors 52 and 53 are varied by means of a master controller MC which may be divided into two sections, one designated AC, which is utilized during acceleration of the vehicle, and the other designated BC, which is utilized during dynamic braking of the vehicle. Since the controller is operated by the operator of the vehicle, the accelerating and braking rates may be varied by the operator as desired.

The accelerator A is provided with resistors 54 and 55 for controlling the current in the motors 10 and 11. The resistor 54 is divided into a number of subdivisions which are connected to the contact fingers 21 to 30, inclusive, and the resistor 55 is divided into subdivisions which are connected to the contact fingers 31 to 40, inclusive. In the present system, the resistors 54 and 55 are connected in the motor circuit in series-circuit relation during both acceleration and dynamic braking, thereby making it unnecessary to change the resistor connections when transferring from motoring to braking operation.

As described in Patent No. 2,254,911, issued September 2, 1941, to L. G. Riley, resistors 56 and 57 are connected in the motor circuit in parallel-circuit relation to the resistors 54 and 55 during the motoring operation. Since part of the motor current is diverted through the resistors 56 and 57, the heating effect on the accelerator is reduced and also arcing of the contact fingers on the accelerator is reduced.

As shown, the accelerator A is provided with a drum switch 58 having a plurality of contact segments 61 and 67, inclusive, and cooperating contact fingers which engage the contact segments as the accelerator is driven by the shaft 41. The reference numerals 21' to 30' indicate the contact fingers over which the roller 19 travels, while the contact segments are engaged by their respective contact fingers. It will be seen that the roller 20 travels over the fingers 31 to 40 while the roller 19 travels over fingers 21 to 30. The function of the different segments of the drum switch 58 will be explained more fully hereinafter.

In addition to the accelerator and the control switches previously mentioned, numerous other switches are provided and perform certain switching operations. These include a switch LS2 for shunting a resistor 68 from the motor circuit, a switch M1 for connecting the motors to the accelerator during acceleration of the vehicle, a switch G for connecting the accelerator resistors to ground during acceleration, a switch M2 for connecting the motors directly to ground through the switch G after the accelerator resistors have been shunted from the motor circuit by the accelerator rollers, a switch R for connecting the resistors 56 and 57 in the motor circuit during acceleration as previously described, and field shunting switches S1, S2 and S5 for shunting the field winding 13 of the motor 10 and also field shunting switches S3, S4 and S6 for shunting the field 15 of the motor 14 in successive steps, as will be explained more fully hereinafter. Preferably, the field shunting switches are utilized to so control the building up of the dynamic braking current that overvoltage of the motors is prevented, particularly when the vehicle is running at high speeds when dynamic braking is applied. The operation of the field shunting switches is controlled by the limit relay LR to prevent an excessive current, and, therefore, prevent excessive voltage being developed in the motors. Furthermore, the accelerator A cannot start progressing to shunt the resistance from the motor circuit until after the successive operation of the field shunting switches is completed.

In order to permit the present system to be utilized on cars which are operated in multiple-unit trains and controlled from one control station at the head of the train, a braking relay BR is provided. The relay BR permits dynamic braking to be established simultaneously on all the cars of the train. In the present system, the energization of the relay BR is controlled by the braking controller BC in conjunction with the limit relay LR and the dynamic braking switch B2.

As described in my Patent 2,318,331, issued May 4, 1943, the switch M2 is provided with interlocking members which cause the pilot motor PM to be returned to its initial position in preparation for an establishment of the dynamic braking circuit for the motors when the switch M2 is closed to connect the motors 10 and 11 directly to ground through the switch G after the accelerator has been fully advanced to shunt its resistance from the motor circuit.

As described in my Patent 2,318,332, issued May 4, 1943, interlocks are provided on the switch R for so controlling the operation of the pilot motor PM that the accelerator may be stopped and held on any position by operating the switch R which is controlled by the accelerating controller AC. Thus, the controller AC is provided with a switching position and variable rate positions.

When the controller AC is actuated to the switching position, the switches LS1, M1 and G are closed to connect the motors to the power circuit in series-circuit relation with the resistors 54 and 55 of the accelerator A and also in series-circuit relation with the resistor 68. At this time, the accelerator A will remain in its initial position. After the car has started moving and the rate of acceleration is to be increased, it is only necessary to actuate the controller AC to one of the rate positions, thereby closing the switch R to connect the resistors 56 and 57 in parallel circuit-relation to the motors and also closing the switch LS2 to shunt the resistor 68 from the motor circuit. The closing of the switch R causes the accelerator to rotate, since the pilot motor is energized through interlocks provided on the switch R, as will be described more fully hereinafter.

If it is desired to stop and hold the accelerator on any given position, the controller AC is returned to the switching position, thereby opening the switch R to deenergize the pilot motor and stopping the accelerator at the desired position. The opening of the switch R also slightly increases the total resistance in the motor circuit to provide a cushioning effect on the motors, thereby providing smoother operation of the vehicle.

Thus, by opening and closing the switch R, the accelerator A is caused either to progress or to hold on a desired position. If automatic acceleration is desired, it is only necessary to actuate the controller AC to any desired rate position and the progression of the pilot motor will be under the control of the limit relay LR.

The foregoing feature is particularly desirable when operating a vehicle through congested traffic areas which require that the acceleration of the vehicle be interrupted frequently. Furthermore, the slight increase in the resistance in the motor circuit caused by the opening of the switch R and the switch LS2 in the foregoing manner, prevents jerking or jumping of the cars during acceleration, as the progression of the accelerator is stopped at a desired running speed.

In order that the functioning of the foregoing apparatus may be more clearly understood, the operation of the system will now be described in more detail. As explained hereinbefore, power may be applied to the motors 10 and 11 by actuating the controller AC to the switching position, thereby closing the switches LS1, M1 and G to connect the motors to the power source.

The energizing circuit for the actuating coil of the switch LS1 may be traced from positive through a contact segment 71 of the controller BC, conductor 72, a contact segment 73 of the controller AC, conductor 74, an interlock 75 on the switch B1, conductor 76, the actuating coil of the switch LS1, conductor 77 and the contact segment 61 of the drum switch 58 to ground. Following the closing of the switch LS1, a holding circuit for the coil of the switch is established through an interlock 78 on the switch LS1. The energizing circuit for the actuating coil of the switch M1 extends from the conductor 76 through the actuating coil of the switch M1 to ground, and the energizing circuit for the coil of the switch G also extends from the conductor 76 through the coil of the switch G to ground.

The closing of the switches LS1, M1 and G connects the motor 10 to the power source through a conductor 81, the switch LS1, the resistor 68, conductor 82, the armature winding 12 and the series field winding 13 of the motor 10, conductor 83, the switch M1, conductor 84, the resistor 55 of the accelerator A, the bus 18, the resistor 54, conductor 85 and the switch G to ground. The circuit through the motor 11 extends from the conductor 82 through the series field winding 15, conductor 86, the series coil 47 of the limit relay LR, conductor 87, the armature winding 14, conductor 83, the switch M1 and thence through the accelerator A and the switch G to ground through a circuit previously traced.

As explained hereinbefore, the motors 10 and 11 operate at a relatively slow speed since all of the accelerator resistance remains connected in the motor circuit. If it is desired to increase the speed of the motors, the controller AC is actuated to one of the rate positions depending upon the rate of acceleration desired.

When the controller AC is actuated to one of the rate positions, the switch R is closed to connect the resistors 56 and 57 in parallel-circuit relation to the resistors of the accelerator A, thereby reducing the duty imposed upon the accelerator and also making it possible to connect the resistors 54 and 55 of the accelerator in series-circuit relation during motoring as well as during dynamic braking. The energizing circuit for the actuating coil of the switch R may be traced from a contact segment 88 of the controller AC through conductor 89, and interlock 91 on the switch LS1, conductor 92 and the actuating coil of the switch R to ground.

Following the closing of the switch R, the switch LS2 is closed to shunt the resistor 68 from the motor circuit. The energizing circuit for the actuating coil of the switch LS2 extends from the conductor 92 through an interlock 93 on the switch R, conductor 94 and the actuating coil of the switch LS2 to ground.

As explained hereinbefore, the closing of the switch R also establishes a circuit for energizing the pilot motor PM to advance the accelerator A, the pilot motor being under the control of the limit relay LR which, as explained hereinbefore, is responsive to the motor current. The energizing circuit for the pilot motor may be traced from positive through the trickler coil 51, contact members 97 and 98 of the relay LR, conductor 99, an interlock 103 on the switch R, conductor 104, an interlock 105 on the switch M2, conductor 106, the contact segments 66 of the drum switch 58, conductor 107, the "on" field winding 45 and the armature winding 44 of the motor PM to ground.

As explained hereinbefore, the motor PM advances the accelerator A under the control of the limit relay LR unless the controller AC is returned to the switching position to deenergize the actuating coils of the switches R and LS2, thereby causing these switches to open. The opening of the switch R opens the interlock 103 carried by this switch, thereby deenergizing the pilot motor PM independently of any action of the limit relay LR. Accordingly, the pilot motor PM is stopped and the accelerator A will remain in the position in which it was at the time of the opening of the switch R until the controller AC is actuated to a rate position to reclose the switch R, at which time the accelerator will continue to advance under the control of the limit relay.

When the accelerator A nears the end of its travel in a forward direction, the switch M2 is closed to connect the motors 10 and 11 directly to ground through the switch G. The energizing circuit for the actuating coil of the switch M2 may be traced from the previously-energized conductor 92 through an interlock 108 on the switch LS2, conductor 109, the actuating coil of the switch M2, conductor 111 and the contact segment 62 of the drum switch 58 to ground. A holding circuit for the coil of the switch M2 is established through an interlock 112 carried by the switch.

The closing of the switch M2 connects the motors 10 and 11 directly to ground through the switch G, thereby permitting the accelerator A to be returned to its initial position in preparation for an establishment of the dynamic braking circuit for the motors. The closing of the switch M2 also opens its interlock 105, thereby interrupting the energizing circuit for the pilot motor PM which operated the motor in the forward direction.

Furthermore, the closing of the switch M2 energizes the "off" field winding 46 of the pilot motor, thereby causing it to operate in the reverse direction to return the accelerator A to its initial position. At this time, the energizing circuit for the pilot motor may be traced from positive through an interlock 113 on the switch M2, conductor 114, the contact segment 67 of the drum switch 58, conductor 115, the "off" field winding 46 and the armature winding 44 of the motor PM to ground.

As indicated by the sequence chart shown in Fig. 2, the field shunting switches S1, S3, S2 and S4 are closed successively as the accelerator A returns to its initial position. The energizing circuit for the switch S1 extends from the previously-energized conductor 92 through an interlock 116 on the switch M2, conductor 117, the actuating coil of the switch S1, conductor 118 and the contact segment 64 of the drum switch 58 to ground. The energizing circuit for the switch S3 extends from the conductor 117 through the actuating coil of the switch S3, conductor 119 and the contact segment 64 to ground. The energizing circuit for the switch S2 extends from the conductor 117 through an interlock 121 on the switch B2, conductor 122, another interlock 123 on the switch B2, conductor 124, the actuating coil of the switch S2, conductor 125 and the contact segment 65 of the drum switch 58 to ground.

The energizing circuit for the switch S4 extends from the conductor 124 through the actuating coil of the switch S4, conductor 126 and the segment 65 to ground.

If it is desired, to permit the vehicle to coast, the motors 10 and 11 may be disconnected from the power source by actuating the controller AC to the "off" position, thereby deenergizing the actuating coils for the switches LS1, LS2, M1, M2, R and G. When the controller AC is returned to the "off" position, the field shunting switches S1, S2, S3, S4, S5 and S6 are closed to shunt the field windings 13 and 15 of the motors 10 and 11, respectively.

The energizing circuit for the switch S1 may be traced from positive through a contact segment 127 on the controller AC, conductor 128, an interlock 129 on the switch G, conductor 122, the interlock 121 on the switch B2, conductor 117, the actuating coil of the switch S1 and thence to ground through a circuit previously traced. The energizing circuit for the switch S3 extends from the conductor 117 through the actuating coil and thence to ground as previously traced. The energizing circuit for the switch S2 extends from the conductor 122 through the interlock 123 on the switch B2, conductor 124, the actuating coil of the switch S2 and thence to ground through a circuit previously traced. The energizing circuit for the switch S4 extends from a conductor 124 through the actuating coil and thence to ground as previously traced. The energizing circuit for the switch S5 extends from the conductor 122 through an interlock 131 on the switch B2, conductor 132, an interlock 133 on the switch G, conductor 134 and the actuating coil of the switch S5 to ground. The energizing circuit for the switch S6 extends from the conductor 134 through the actuating coil of the switch to ground.

In the event that dynamic braking is required to decelerate the vehicle, the controller BC is actuated to one of the braking positions, thereby closing the switches B1 and B2 to establish the dynamic braking connections. The energizing circuit for the switch B1 may be traced from positive through a segment 135 on the controller BC, conductor 136, an interlock 137 on the switch LS1, conductor 138, the actuating coil of the switch B1, conductor 139 and a segment 63 on the drum switch 58 to ground. The energizing circuit for the switch B2 extends from the conductor 138 through the actuating coil of the switch B2 and thence to ground through the conductor 139 and the segment 63.

It will be noted that the accelerator A was returned to its initial position when both of the controllers AC and BC were actuated to their "off" positions. The energizing circuit for operating the pilot motor PM in the reverse direction to return the accelerator A to its initial position may be traced from positive through an interlock 141 on the switch LS1, conductor 142, an interlock 143 on the switch B1, conductor 114, the segment 67 on the drum switch 58, conductor 115, the "off" field winding 46 and the armature winding 44 of the motor PM to negative.

As previously explained, the field shunting switches S1 to S6, inclusive, were closed when both of the controllers AC and BC were actuated to the "off" position and these switches remain closed after the switches B1 and B2 are closed to establish the dynamic braking connections, thereby preventing an overvoltage from being developed by the motors as a result of high speed operation of the vehicle. The holding circuit for the switches S2 and S4 extends from the conductor 122 through the contact members of the relay BR, conductor 144, an interlock 145 on the switch S4 and conductor 124 to the actuating coils of the switches S2 and S4. The holding circuit for the switches S5 and S6 extends from the conductor 122 through an interlock 146 on the switch S4 and conductor 134 to the actuating coils of the switches S5 and S6. The holding circuit for the switches S1 and S3 extends from the conductor 122 through an interlock 147 on the switch S5 to the conductor 117 and thence to the actuating coils of the switches S1 and S3.

As the speed of the motors decreases, the current in the limit relay LR will decrease sufficiently to permit its contact members to close, thereby energizing the actuating coil of the relay BR. The energizing circuit for the relay BR extends from the conductor 99 through an interlock 148 on the switch B2, conductor 149 and the actuating coil of the relay BR to ground.

The energization of the actuating coil of the relay BR opens its contact members to interrupt the circuit from the conductor 122 to the conductor 144, thereby causing the switches S2 and S4 to open. The opening of the switches S2 and S4 decreases the field shunting effect on the motors, thereby permitting the motor current to increase which opens the contact members of the limit relay LR, thereby deenergizing the relay BR. As the switch S4 opens, the holding circuit for the switches S5 and S6, which previously extended from the conductor 122 through the interlock 146 on the switch S4 to the conductor 134, is transferred to a circuit extending from the conductor 122 through the contact members of the relay BR to the conductor 144, an interlock 151 on the switch S5, conductor 152 and an interlock 153 on the switch S4 to the conductor 134.

When the motor current again decreases sufficiently to permit the contact members of the relay LR to close, the relay BR is energized to open its contact members, thereby deenergizing the actuating coils of the switches S5 and S6 by interrupting the holding circuit previously traced. The opening of the switches S5 and S6 causes the motor current to increase, thereby operating the limit relay LR to deenergize the relay BR as previously described.

When the contact members of the relay BR are reclosed, the holding circuit which previously extended from the conductor 122 through the interlock 147 on the switch S5 to the conductor 117 and the actuating coils of the switches S1 and S3 is transferred from the conductor 122 through the contact members of the relay BR to the conductor 144, an interlock 154 on the switch S1, conductor 155 and an interlock 156 on the switch S5 to the conductor 117.

When the motor current decreases sufficiently to permit the contact members of the relay LR to close, the relay BR is energized to open its contact members, thereby deenergizing the actuating coils of the switches S1 and S3 causing these switches to open as the limit relay functions for the third time. In this manner, the field shunting effect on the motors 10 and 11 is reduced in three successive steps as the speed of the motors decreases, thereby preventing an excessive braking current and hence an overvoltage from being developed in case dynamic braking is applied while the motors are operating at high speeds.

Following the opening of the switch S1, an energizing circuit is established for the pilot motor PM to cause this motor to advance the accelerator A to shunt the resistors 54 and 55 from the motor circuit. The energizing circuit for the pilot motor may be traced from the conductor 99 through an interlock 157 on the switch S1, conductor 158, an interlock 159 on the switch B2, conductor 104, an interlock 105 on the switch M2 and thence to the switch M2 and thence to the pilot motor through a circuit previously traced.

As explained hereinbefore, the accelerator is advanced under the control of the limit relay during dynamic braking, thereby controlling the braking current by varying the resistance in the motor circuit. When the accelerator A is fully advanced at the end of the braking cycle, the actuating coil for the switch M2 is energized through a circuit established through an interlock 161 on the switch B2 and the contact segment 62 on the drum switch 58. In this manner, the resistors 54 and 55 of the accelerator A are shunted from the motor circuit after the accelerator is fully advanced during dynamic braking and the accelerator is returned to its initial position in preparation for an accelerating cycle of operation.

From the foregoing description, it is apparent that I have provided a simplified and improved system for controlling the operation of railway vehicles which permits operation of field shunting switches to build up dynamic braking and prevents overvoltage of the motors when the vehicle is running at high speeds. While the present system is particularly suitable for utilization on vehicles operating in multiple-unit trains, it is not necessarily limited thereto and may be utilized on vehicles operating as single units.

Since numerous changes may be made in the above-described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a motor control system, in combination, a direct current motor of the series type for propelling a vehicle, power conductors, switching means for connecting the motor to the power conductors, switching means for establishing dynamic braking connections for the motor, means for shunting the motor field during dynamic braking, relay means responsive to the motor current for controlling the operation of said field shunting means, and manually controlled means for changing the setting of said relay means to vary the dynamic braking rate.

2. In a motor control system, in combination, a direct current motor of the series type for propelling a vehicle, power conductors, switching means for connecting the motor to the power conductors, switching means for establishing dynamic braking connections for the motor, means for shunting the motor field when dynamic braking is established, relay means responsive to the motor current for controlling the disconnecting of said field shunting means, and manually controlled means for changing the setting of said relay means to vary the dynamic braking rate.

3. In a motor control system, in combination, a direct current motor of the series type for propelling a vehicle, power conductors, switching means for connecting the motor to the power conductors, switching means for establishing dynamic braking connections for the motor, a plurality of field shunting switches, and relay means responsive to the motor current for controlling the operation of said switches during dynamic braking.

4. In a motor control system, in combination, a direct current motor of the series type for propelling a vehicle, power conductors, switching means for connecting the motor to the power conductors, switching means for establishing dynamic braking connections for the motor, a plurality of switches for shunting the motor field when dynamic braking is established, and relay means responsive to the motor current for controlling the opening of said switches.

5. In a motor control system, in combination, a direct current motor of the series type for propelling a vehicle, power conductors, switching means for connecting the motor to the power conductors, switching means for establishing dynamic braking connections for the motor, a plurality of switches for shunting the motor field when dynamic braking is established, and relay means responsive to the motor current for causing the opening of said switches successively.

6. In a motor control system, in combination, a direct current motor of the series type for propelling a vehicle, power conductors, switching means for connecting the motor to the power conductors, switching means for establishing dynamic braking connections for the motor, variable resistance means for controlling the motor current, means for shunting the motor field during dynamic braking, and relay means responsive to the motor current for controlling the operation of said field shunting means and said variable resistance means.

7. In a motor control system, in combination, a direct current motor of the series type for propelling a vehicle, power conductors, switching means for connecting the motor to the power conductors, switching means for establishing dynamic braking connections for the motor, variable resistance means for controlling the motor current, means for shunting the motor field when dynamic braking is established, and relay means responsive to the motor current for controlling the disconnecting of said field shunting means and the operation of said variable resistance means.

8. In a motor control system, in combination, a direct current motor of the series type for propelling a vehicle, power conductors, switching means for connecting the motor to the power conductors, switching means for establishing dynamic braking connections for the motor, variable resistance means for controlling the motor current, a plurality of field shunting switches, and relay means responsive to the motor current for controlling the operation of said switches and said variable resistance means during dynamic braking.

9. In a motor control system, in combination, a direct current motor of the series type for propelling a vehicle, power conductors, switching means for connecting the motor to the power conductors, switching means for establishing dynamic braking connections for the motor, variable resistance means for controlling the motor current, a plurality of switches for shunting the motor field when dynamic braking is established, and relay means responsive to the motor current for controlling the opening of said switches and the operation of said variable resistance means during dynamic braking.

10. In a motor control system, in combination, a direct current motor of the series type for propelling a vehicle, power conductors, switching means for connecting the motor to the power conductors, switching means for establishing dynamic braking connections for the motor, variable resistance means for controlling the motor current, a plurality of switches for shunting the motor field when dynamic braking is established, and relay means responsive to the motor current for causing the opening of said switches successively during dynamic braking, the operation of said variable resistance means being dependent upon the opening of the last of said switches.

GEORGE R. PURIFOY.

REFERENCES CITED

The following references are of record in the file of this patent:

UNITED STATES PATENTS

| Number | Name | Date |
|---|---|---|
| 1,047,151 | Baxter | Dec. 17, 1912 |
| 1,738,433 | Jewitt | Dec. 3, 1929 |